June 7, 1960
G. A. LYON
2,939,203
SHELL NOSING APPARATUS
Filed Dec. 20, 1954
5 Sheets-Sheet 3
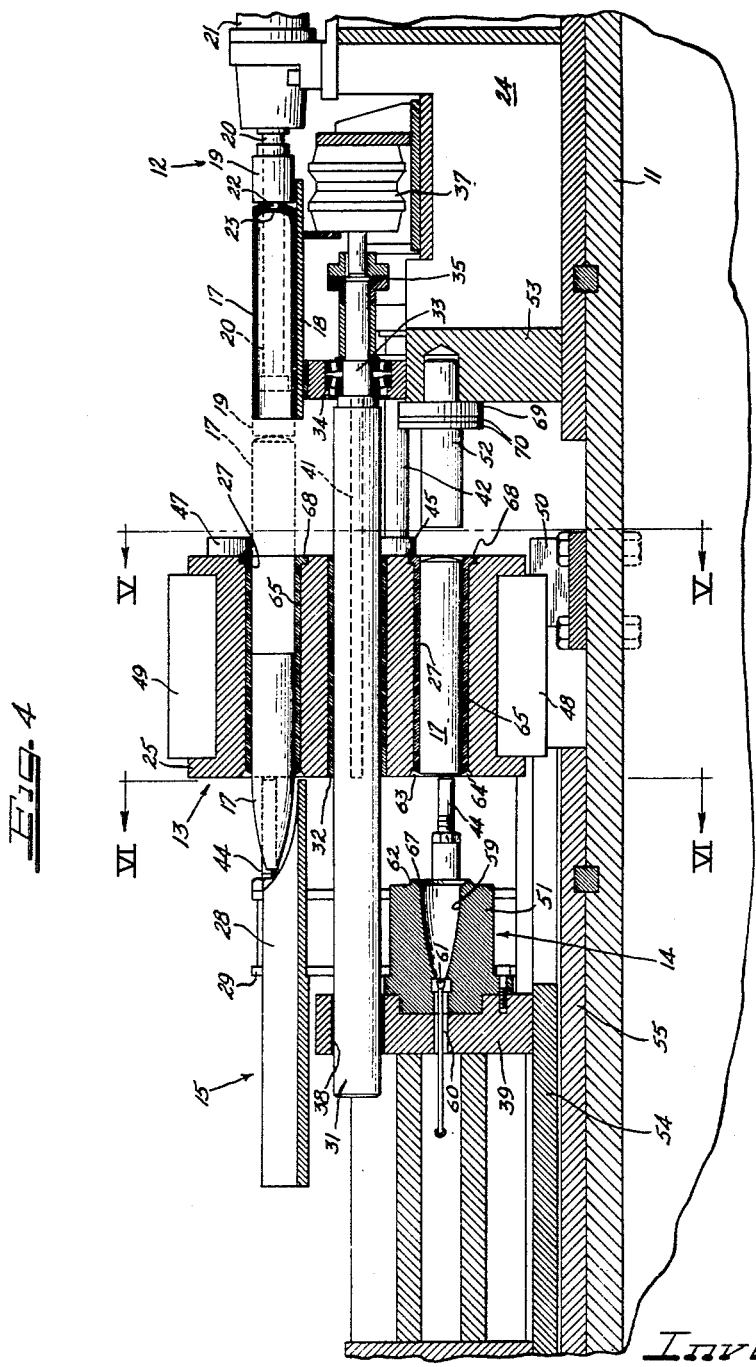
Inventor
GEORGE ALBERT LYON
by Hill, Sherman, Meroni, Gross & Simpson
Attys.

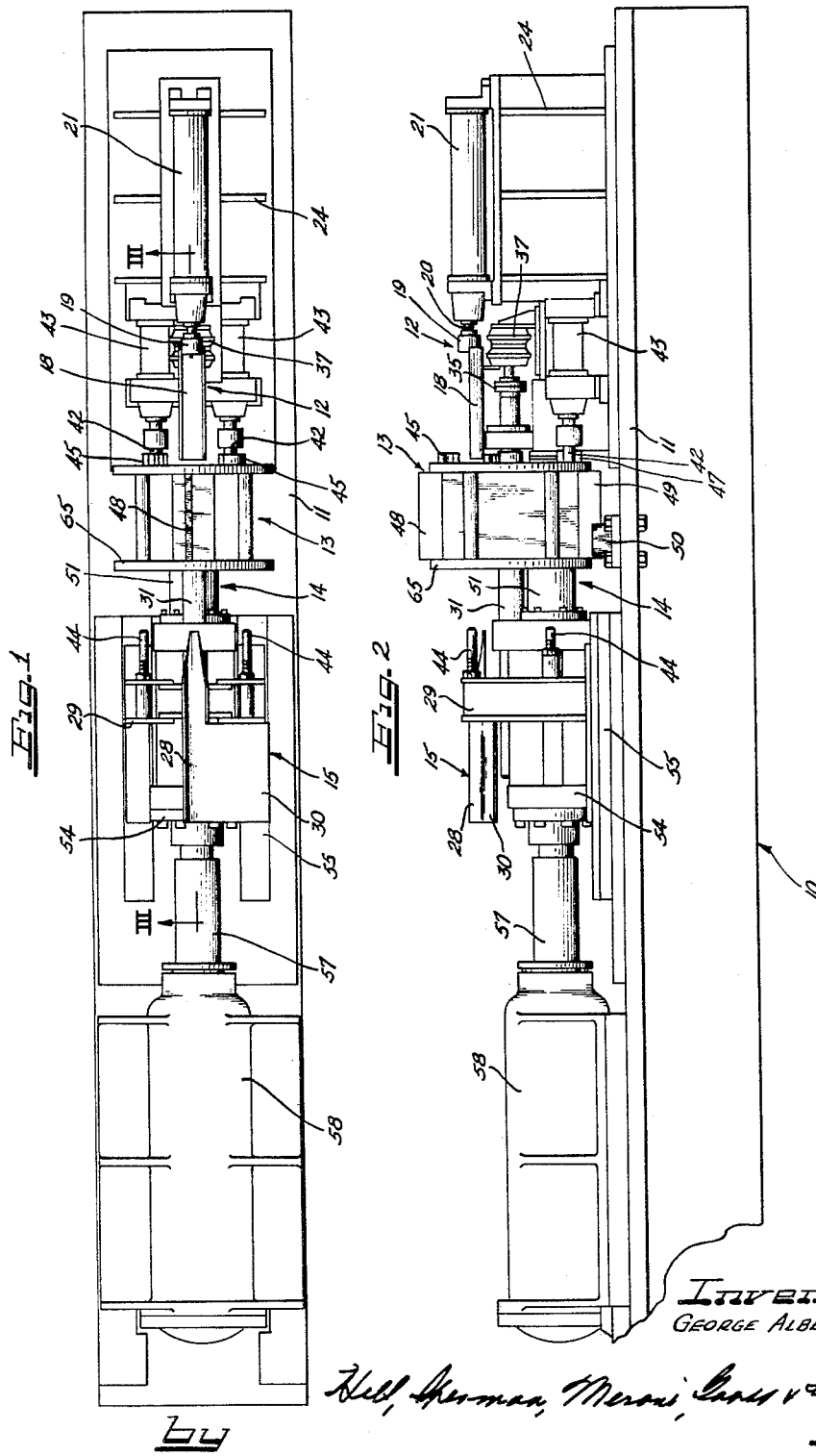

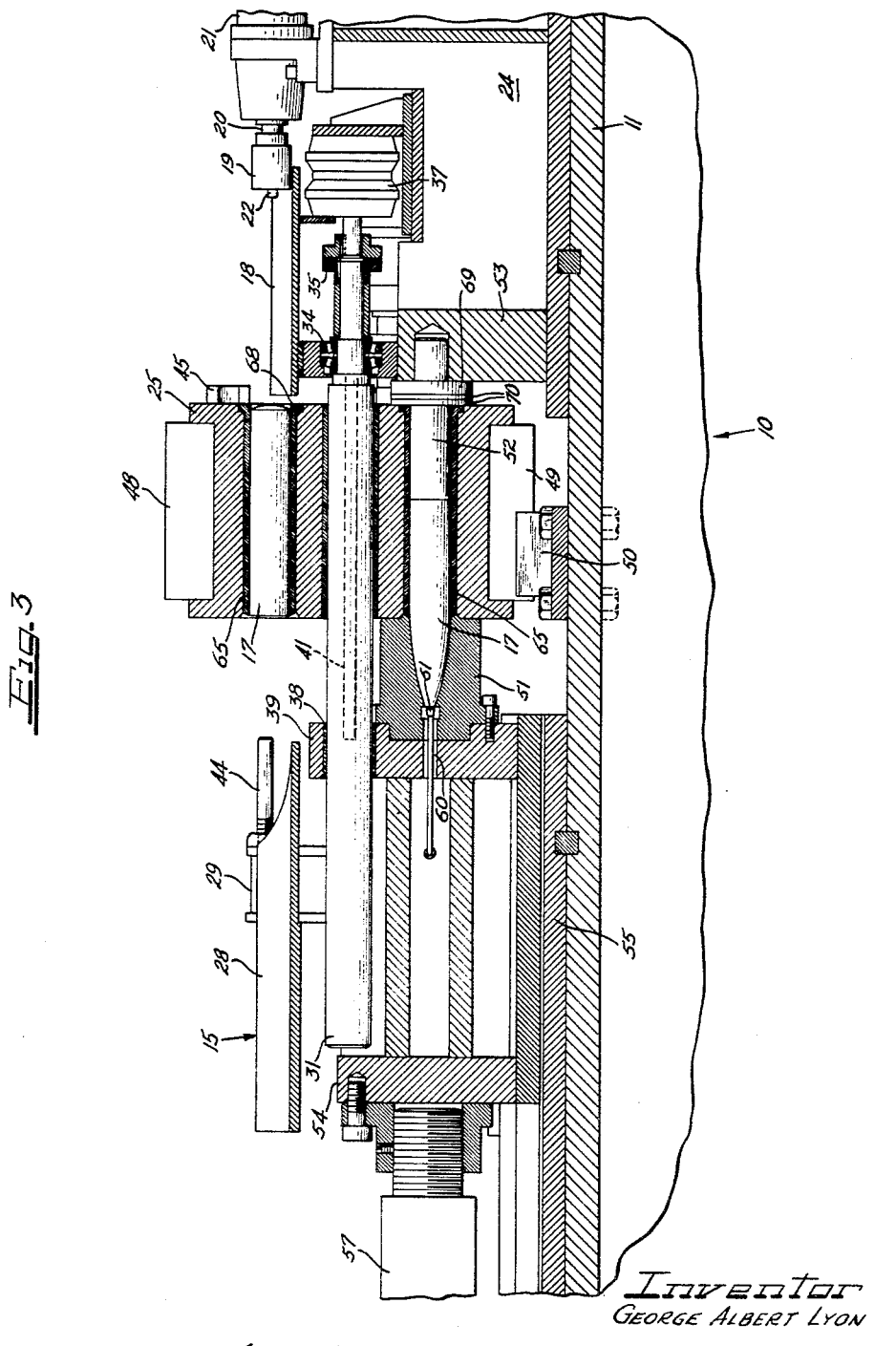

June 7, 1960 G. A. LYON 2,939,203
SHELL NOSING APPARATUS
Filed Dec. 20, 1954 5 Sheets-Sheet 4

Inventor
GEORGE ALBERT LYON
by Attys.

United States Patent Office 2,939,203
Patented June 7, 1960

2,939,203

SHELL NOSING APPARATUS

George Albert Lyon, 13881 W. Chicago Blvd., Detroit, Mich.

Filed Dec. 20, 1954, Ser. No. 476,169

4 Claims. (Cl. 29—1.21)

The present invention relates to nosing of ordnance shells and is applicable to nosing of various sizes of shells from artillery size up to large aerial drop bombs.

In the making of ordnance shells of substantial size, especially by drawing the shells from metal blanks into elongated tubular shape with thin substantially cylindrical longitudinal walls and a substantially thicker base wall, the open end portions of the shells are symmetrically generally conoidaly nose tapered. Heretofore nosing of the shells has been a laborious, expensive operation.

It is an important object of the present invention to provide an improved, simplified, low-cost, mass production, method and apparatus for nosing ordnance shells.

Another object of the invention is to provide a method and means readily adaptable for nosing ordnance shells of various sizes and especially useful in nosing large shells such as employed in the head or body portions of low drag bombs.

A further object of the invention is to provide a novel cyclically operable machine for rapid mass production nosing of ordnance shells.

Other objects, features and advantages of the present invention will be readily apparent from the following detailed description of a preferred embodiment taken in conjunction with the accompanying drawings, in which:

Figure 1 is a more or less schematic top plan view of a nosing machine embodying features of the present invention.

Figure 2 is a side elevational view of the machine of Figure 1.

Figure 3 is a fragmentary, enlarged longitudinal vertical sectional view taken substantially on the line III—III of Figure 1.

Figure 4 is a sectional view similar to Figure 3 but showing the parts in a different operative relationship.

Figure 5:
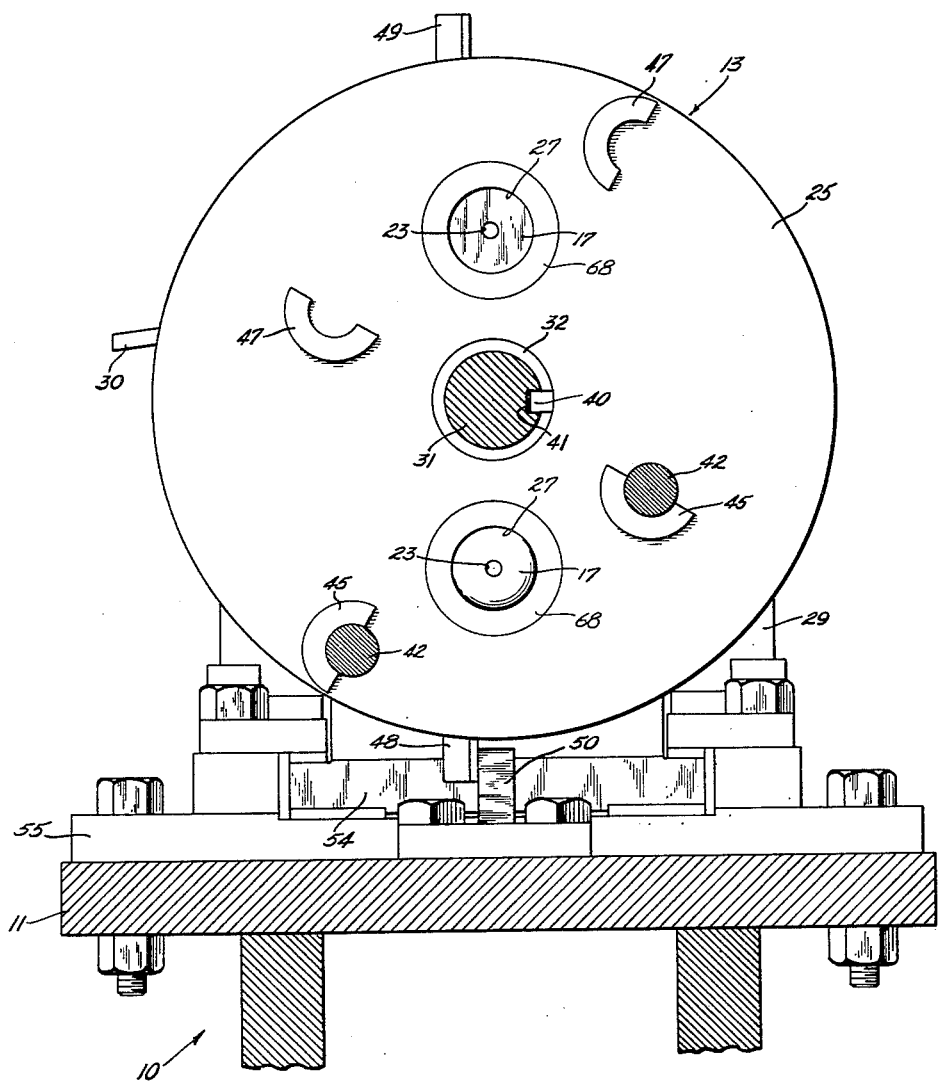
Figure 5 is a vertical transverse sectional detail view taken substantially on the line V—V of Figure 4.

According to the present invention, shells to be nosed are fed into a breech-like circumscribing support with which the successive shells are carried to a nosing die assembly including a nosing die member and a ram. While the ram engages the butt end of the shell and the nosing die receives the tip or nose end of the shell the shell supporting member is moved reciprocably relative to the die and ram members and the die and ram members are moved relatively toward one another. Thereby, the nose end portion of the shell is taper nosed while the remaining portion of the shell wall is held by the circumscribing wall of the supporting member against spreading as the nosing pressure is exerted against the nose portion of the shell and contracts the same. The supporting member and the nosing die and ram members are relatively backed off from one another and the nosed shell is then ejected from the carrying member. As an incident to nosing, the butt end of the shell may also be preheaded by the ram member.

The nosing method as thus briefly outlined, will be amplified in connection with description of the construction and operation of the exemplary machine shown in the drawings. While it will be apparent that if preferred the machine may be used vertically, without much modification, it lends itself conveniently, as shown, to horizontal operations.

A suitable base structure or frame 10 which may include a heavy horizontal elongated base plate or table 11 may be provided to support the various components of the machine. The principal components include feeding mechanism 12, breech-like shell carrying and supporting means 13, nosing die and ram mechanism 14, and unloading means 15.

For supporting a shell 17 to be fed into the supporting and carrying means 13, an elongated feed ramp or trough 18 is fixably mounted at a suitable elevation above the table 11. Operating from the rear end portion of the feed trough 18 is a feed ram 19 carried at the outer end of a piston rod 20 having in any preferred manner a hydraulic operating mechanism including a cylinder 21 within which a piston on the end of the rod is reciprocably motivated. For maintaining the rear end portion of the respective shells 17 in centered association with the ram 19, an axial centering pin boss or projection 22 is provided on the forward end of the ram 19 engageable in an axial aperture 23 in the initially outwardly bulged, thickened base portion of the shell (Fig. 4). For supporting the feed structure 12 a suitable supporting frame structure 24 is carried fixably by the base plate or table 11.

While in Figures 1, 2 and 3 the apparatus is depicted in the relationship of the components at completion of a nosing operation in the operative cycle of the machine, in Fig. 4 the apparatus is shown as it normally appears at the beginning of a cycle of operation, or during the inactive phase of the machine. For illustrative purposes, it is assumed in Fig. 4 that the machine is ready for a new cycle of operation following completion of one cycle wherein one of the shells 17 has been nosed and the shell-supporting breech or magazine structure 13 is in position to receive another of the shells 17 to be nosed to replace the shell that was previously nosed.

To this end, a breech or magazine member 25 which comprises the principal component or element of the shell-supporting unit of the apparatus, is disposed in position wherein a shell receiving chamber 27 is axially aligned with the shell feed trough 18. It will be observed that such chamber may have therein the shell 17 previously nosed and which will be ejected by feeding of the next shell to be nosed into this chamber 27. Accordingly, the ram 19 is appropriately motivated to drive the next shell 17 as indicated by the broken line position in Figure 4, whereupon continued movement will be effective from the feed trough 18 axially forwardly into the chamber 27 and against the butt end of the nosed shell 17 to drive the nosed shell 17 from the chamber 27 and onto a receiving trough 28 on the opposite side of the magazine member 25 forming part of the receiving structure 15 and supported by a suitable framework 29 carried rigidly above the base structure 10 and more particularly upon the plate or table 11. Eventually the nosed shell 17 may roll off of the receiving trough 28 down a ramp 30 into a receiver or transporting device (not shown) to be carried away from the machine.

Herein the magazine or carrier member 25 is rotatably mounted for rotary indexing and is longitudinally reciprocably supported for operative cooperation with the nosing die means 14. To this end, the magazine member 25 may be formed as a cast or otherwise constructed more or less drum-like mass herein shown as cylindrical but obviously may take other peripheral forms such as rectangular or other polygonal forms, if desired. In this instance, moreover, the magazine member 25 is shown as having a pair of alternately usable ones of the chambers 27, but the number of chambers may obviously be altered as preferred. For as light weight as practicable, the magazine member 25 may be formed from aluminum, aluminum alloy, or other light weight metal, preferably alloy construction, or if preferred may be formed for some reinforced synthetic plastic material.

For rotatable and reciprocable support of the magazine member 25, a suitable shaft 31 is provided extending concentrically through the magazine member 25 which for this purpose is provided with an axial bore having a bearing bushing liner 32 or other suitable bearing means. At one end the shaft 31 is provided with a journal 33 rotatably supported by bearing means 34 carried by the supporting framework 24 under the feed trough 18. Through a suitable coupling 35 the shaft journal 33 is connected for oscillational rotation to a motor 37. The opposite end portion of the shaft 31 is supported rotatably within a bearing 38 carried by a head block or structure 39 below the unloading device 15. For maintaining a corotational relationship between the shaft 31 and the magazine 25, a key 40 on the magazine member extends longitudinally slidably into a longitudinal keyway 41 (Figs. 4 and 5) in the periphery of the shaft 31.

In the non-active or in the load-unload position shown in Fig. 4, a pair of thrust plungers 42 (Figs. 1, 2 and 5) reciprocably carried by hydraulic cylinders 43 mounted upon the base of the framework 24 thrust hydraulically against the magazine member 25 to drive it into a forward limit position as determined by appropriately disposed adjustable stop pins or member 44 (Figs. 1, 4 and 6) supported by the frame 29. In this position of the magazine member 25 the herein uppermost chamber 27 has its forward end adjacent to the rear end of the unloading trough 28.

Figure 6:
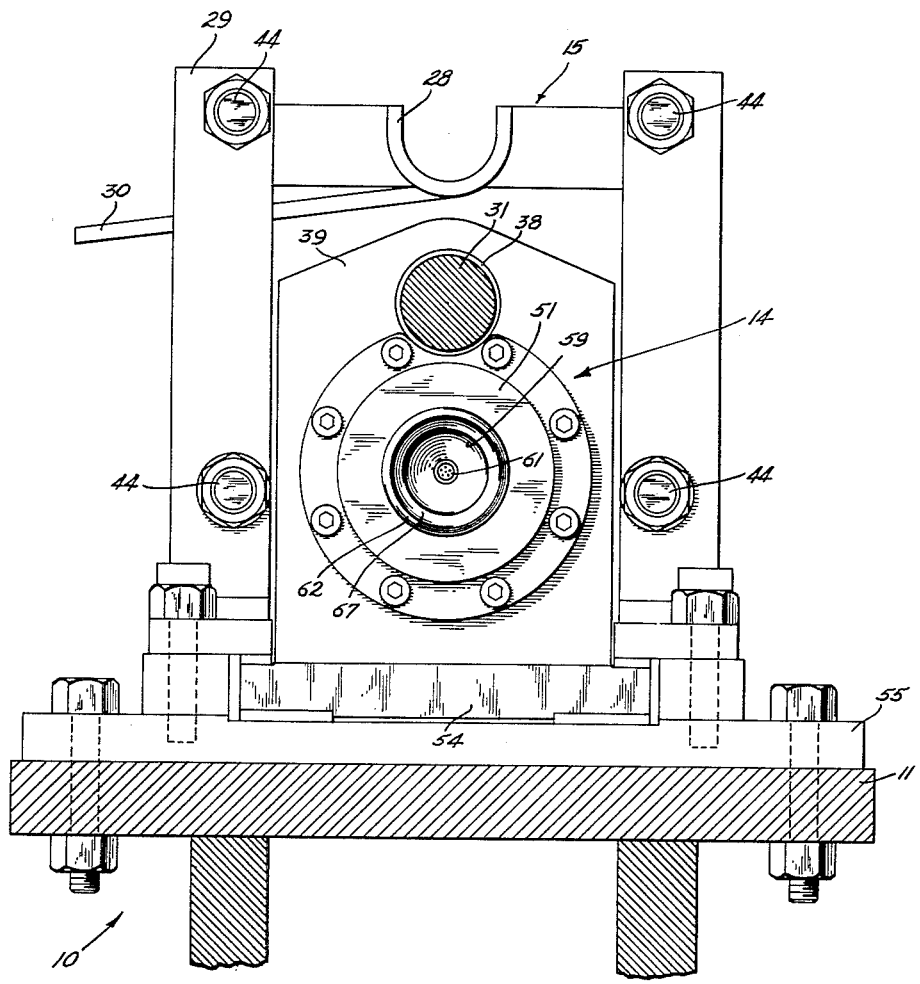
Figure 6 is a transverse vertical sectional view taken substantially on the line VI—VI of Figure 4.

Alignment of the chambers 27 with respectively the aligned loading and unloading troughs 18 and 28, and with the nosing device 14 is assured by rotary stop means herein comprising a respective pair of semi-circular stop members 45 rigidly projecting rearwardly from the rear face of the magazine member 25 and engageable in one limit of oscillation as shown in Figs. 4 and 5 with the thrust rods 42. In the opposite limit of oscillation of the magazine member 25 a respective pair of semi-circular stop members 47 projecting rearwardly from the rear face of the magazine member 25 engage with the thrust rods 42, as in Figs. 1 and 3.

In addition, or alternatively, as preferred, longitudinally extending and radially outwardly projecting substantially diametrically opposite stop wings or flanges 48 and 49 are provided on the periphery of the magazine member 25 to engage respectively against opposite sides of an upstanding stop bar or lug 50 carried by the base plate or table 11.

Following loading of the uppermost of the chambers 27 by driving one of the shells 17 to be nosed thereinto as indicated in an intermediate position of loading by the dash outline in Fig. 4, and retraction of the feeding plunger 19, the motor 37 is operated to turn the shaft 31 and thereby rotate the magazine 25 a half turn until the stop members 47 engage the thrust bars 42 and the stop flange or fin 49 engages the stop bar 50. On the other hand, if, as shown in Fig. 4, there is already one of the shells 17 loaded into the lowermost of the chambers 27, nosing thereof can proceed as soon as the loading operation in the upper chamber has taken place.

In the nosing operation, the nosing die means 14 act to taper nose the forward end of the shell 17 aligned therewith and at the same time substantially flatten out the bulged butt end of the shell. To this end, the nosing means comprise a nosing die 51 (Figs. 2, 3 and 4) and a butt plunger 52 coaxially aligned and respectively supported by the supporting member 39 and a supporting block or column 53, respectively.

According to the present invention the nosing die 51 is reciprocably mounted. To this end, the supporting member 39 is mounted upon a reciprocable ram structure 54 reciprocably supported upon a track or slideway 55 fixedly mounted upon the supporting base plate or table 11. A shaft 57 is secured to the ram structure 54 and is hydraulically motivated as by means of a hydraulic cylinder 58. Within the nosing die 51 is a conoidal rearwardly opening nosing cavity 59 preferably vented at its tip through a bore 60, and means are provided for delivering suitable lubricant into the cavity, such for example as a spray nozzle device 61 located within the bore 60 adjacent the tip of the cavity.

In the nosing operation, the ram structure 54 is driven by the hydraulically operated shaft 57 axially rearwardly toward the magazine member 25 until the die member 51 registers with the aligned shell cavity 27. Thereupon an annular interlock and centering rib 62 projecting from the nosing die member 51 about the mouth of the cavity 59 registers within a complementary groove 63 about the adjacent mouth of the chamber 27. Thereby interengagement of a rearwardly and outwardly tapered end surface 64 on the forward end of a hardened tubular bushing or liner 65 within the chamber 27 is effected by a complemental inwardly tapered surface 67 at the radially inner side of the nosing die rib 62. This effects a close coaxial positive joint of the nosing die with the liner 65 to avoid ribbing of the outer periphery of the shell at the joint as nosing progresses.

Continued nosing pressure rearwardly against the magazine member 25 by the nosing die 51 shifts the magazine member rearwardly and causes backing off of the inactivated thrust bars 42 until the butt plunger 52 engages the butt end of the shell 17. Since the butt plunger 52 is, in the present instance, mounted stationarily on the stationary supporting member 53, a continued rearward thrusting of the nosing die member 51 continues to carry the magazine member 25 rearwardly while the shell 17 to be nosed is now held stationarily by the butt plunger 52 so that the open forward end of the shell progressively projects into the nosing cavity 59 wherein the shell nose is gradually progressively contracted conformable to and complementary to the tapered nosing cavity 59. Nosing pressure and thus rearward movement of the nosing die 51 is continued until a rear end collar flange 68 on the liner 65 abuts a stop collar 69 or a stop washer 70 on the rear end portion of the plunger member 52. The extent or depth of nosing is controlled by the thickness of or the number of combined stop washers 70, or the absence of such washers forwardly of the stop shoulder collar 69. As a matter of fact, it is desirable to effect nosing of the shells in two or three stages with intermediate annealing steps, depending upon the mass of metal to be contracted in the nose portions of the shells.

Upon completion of the nosing action, the nosed shell 17 will project forwardly from the magazine member 25 to the extent of the nosing taper effected thereon by the nosing die, substantially as shown at the top of Fig. 4. In addition, in view of the great axial pressure to which the shell has been subjected during nosing, the bulged butt end of the shell is substantially flattened by the tip of the butt plunger 52. Radial distortion or outward collapsing of the wall of the shell within the chamber 27 is prevented by the circumscribing liner 65.

Upon completion of the nosing drive of the nosing die 51, it is backed off by return of the ram structure 54, that is from the relative position of the parts as shown in Figs. 2 and 3, the nosing die is returned to the inactive position shown in Fig. 4. At the same time the thrust rods or bars 42 are actuated to back the magazine member 25 clear of the butt plunger 52. Then the magazine member 25 is turned back or oscillated to carry the nosed shell up to the load-unload position and carry a succeeding one of the shells 17 down into the nosing portion.

Loading, unloading and cold nosing are thus carried on by means of the present machine cyclically and with reasonable speed in mass production of projectile shells such as low drag bomb heads.

It has been found desirable to have the inside diameter of the breech-magazine chambers in free sliding relation to the outside diameter of the unnosed shells 17. Thereby, feeding of the shells into the chambers in dry, cold condition is easily effected by the simple expedient of shoving the shells into the chambers as by means of the feed ram 19.

On the other hand, by virtue of the fairly close dimensional correlation between the inside diameter of the chambers and the outside diameter of the shells, the minute radial expansion occurring as a result of nosing pressure applied between the nosing die and the back-up plunger, crowds the generally cylindrical portions of the shells remaining in the chambers at the end of the nosing stroke of the apparatus into reasonably snug engagement within the chamber bores, which, similarly as the shells, are preferably dry wall. Hence, even though the nose of the shell should for any reason stick slightly within the lubricated nosing cavity of the nosing die, resistance to release of the shell nose from the cavity wall as the nosing die backs off will be substantially less than the resistance to pull-out of the main body of the shell from the magazine chamber. Hence, the nosed shell will not be displaced from the chamber during back-off of the nosing die, and therefore the nosed shell will maintain its position with the nosed end portion thereof projecting from the forward side of the magazine to a predetermined extent until the magazine has been turned to bring the chamber carrying the nosed shell to the load-unload position where it will then be driven from the carrying chamber by the thrust of a succeeding shell butting thereagainst under the force of the feed ram 19.

By the method of the present invention cold nosing of projectile shells made from steel such as 1030 or 1010 steel and having thin cylindrical wall portions between the base and nose portions thereof can be effected at rapid mass production rate.

It will be understood that modifications and variations may be effected without departing from the scope of the novel concepts of the present invention.

I claim as my invention:

1. In nosing ordnance shells, placing elongated generally cylindrical shells with thickened outwardly bulging butt end walls into a closely circumscribing supporting chamber, and while supporting the shell within said chamber imposing axially opposite pressure on respectively the butt end of the shell and the nose portion of the shell by means of a nosing die at the nose of the shell and by means of a butt thrust member at the butt end of the shell to nose the shell and to press in the outwardly bulged butt end of the shell.

2. In a nosing die apparatus, a movably mounted shell carrier having a through bore providing a shell receiving chamber, feeding means and unloading means spaced apart to receive the chamber in alignment therebetween, said feeding means including a plunger operative to drive a shell to be nosed into said chamber, nosing means and back-up means cooperatively disposed in spaced relation spaced from said feeding and unloading means, means for moving the carrier from between the feeding and unloading means to position said chamber between the nosing and back-up means, and means for operating the nosing means in cooperation with the back-up means to nose the shell carried within said chamber, said last mentioned means being operative after nosing to back off the nosing means, said carrier moving means being then operative to move the carrier to return the chamber with the nosed shell into position between the feeding and unloading means, the feeding means being then operative to thrust another shell into said chamber and eject the nosed shell therefrom unto the unloading means.

3. In apparatus for nosing elongated tubular thin wall open ended metal shells, a member providing a shell encompassing bore dimensioned to receive the shell to be nosed in closely encompassing sliding fit and of a length at least as long as the shell so that the shell is encompassed throughout its length within the bore when initially loaded into the bore, said bore being open at both ends, a nosing die having therein a nosing cavity with a mouth end opening of the same diameter as the diameter of one end of said bore, means separably supporting said member and said nosing die, means on said nosing die and on said member about said one end of the bore for effecting a close coaxial positive joint of the mouth end of the nosing die cavity and said one end of the bore in the abutting assembly of the nosing die with said member, and plunger means coactive with said member through the opposite end of said bore to thrust the shell to be nosed longitudinally from the bore through said one end of the bore to drive the open end of the shell past said joint into the nosing cavity to effect nosing of the open end of the shell while the entire outer surface of the shell remains encompassed within the bore and across said joint in the nosing cavity.

4. In apparatus as defined in claim 3, said means for maintaining the coaxial positive joint comprising a groove about said one end of said bore and having a tapered surface converging with said one end of the bore, and a complementary rib on the nosing die about the open end of the cavity and having a tapered surface complementary to said groove surface and registering therewith in the assembled relationship of the nosing die with said member.

References Cited in the file of this patent

UNITED STATES PATENTS

| Number | Name | Date |
| --- | --- | --- |
| 167,005 | Meigs | Aug. 24, 1875 |
| 493,897 | Robertson | Mar. 21, 1893 |
| 529,597 | Cayley et al. | Nov. 20, 1894 |
| 840,091 | Schumacher et al. | Jan. 1, 1907 |
| 1,286,726 | Noble | Dec. 3, 1918 |
| 1,477,725 | Smith | Dec. 18, 1923 |
| 1,538,610 | Bast | May 19, 1925 |
| 1,783,261 | Rousseau | Dec. 2, 1930 |
| 2,112,284 | Gaess | Mar. 29, 1938 |
| 2,326,606 | Biggert | Aug. 10, 1943 |
| 2,357,110 | Heimeman | Aug. 29, 1944 |
| 2,367,015 | Finzel et al. | Jan. 9, 1945 |
| 2,404,304 | Layton | July 16, 1946 |
| 2,600,829 | Arengo | June 17, 1952 |
| 2,621,346 | Jacobson et al. | Dec. 16, 1952 |
| 2,639,491 | Rose et al. | May 26, 1953 |
| 2,729,879 | Sampson | Jan. 10, 1956 |
| 2,821,156 | Lyon | Jan. 28, 1958 |

FOREIGN PATENTS

| Number | Country | Date |
| --- | --- | --- |
| 868,941 | France | Oct. 20, 1941 |